United States Patent
Tseng et al.

(10) Patent No.: US 9,693,421 B2
(45) Date of Patent: Jun. 27, 2017

(54) LIGHTING APPARATUS OF ADJUSTABLE COLOR TEMPERATURE AND A METHOD FOR ADJUSTING COLOR TEMPERATURE THEREOF

(71) Applicant: Industrial Technology Research Institute, Hsinchu (TW)

(72) Inventors: Pei-Ling Tseng, Miaoli County (TW); Tsai-Kan Chien, Yunlin County (TW); Sue-Chen Liao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/956,413

(22) Filed: Dec. 2, 2015

(65) Prior Publication Data
US 2016/0381761 A1   Dec. 29, 2016

(30) Foreign Application Priority Data
Jun. 24, 2015  (TW) .............................. 104120343 A (51) Int. Cl.
*H05B 37/02* (2006.01)
*H05B 33/08* (2006.01)

(52) U.S. Cl.
CPC ..... *H05B 33/0896* (2013.01); *H05B 37/0218* (2013.01); *H05B 33/0863* (2013.01); *H05B 37/0227* (2013.01)

(58) Field of Classification Search
CPC .................. H05B 33/0896; H05B 37/0218
See application file for complete search history.

(56) References Cited

U.S. PATENT DOCUMENTS

| 8,040,075 B2 | 10/2011 | Horino |
| 8,274,230 B2 | 9/2012 | Chiu |

(Continued)

FOREIGN PATENT DOCUMENTS

| CN | 201844245 | 5/2011 |
| CN | 103179762 | 6/2013 |

(Continued)

OTHER PUBLICATIONS

Xiu et al., "Application of Color Temperature Tunable LEDs in Smart Lighting System," 2014 15th International conference on Electronic Packaging Technology (ICEPT), Aug. 2014, pp. 1423-1426.

(Continued)

*Primary Examiner* — Tung X Le
*Assistant Examiner* — Raymond R Chai
(74) *Attorney, Agent, or Firm* — Jianq Chyun IP Office (57) ABSTRACT

A lighting apparatus of adjustable color temperature including a luminescent source, a controller and a detector is proposed. The luminescent source is configured to provide an illumination source. The controller is coupled to the luminescent source. The controller is configured to adjust a color temperature of the illumination source according to at least one of global and local color temperatures. The detector is coupled to the controller. The detector is configured to detect a color temperature of a location of the lighting apparatus of adjustable color temperature, so as to provide the local color temperature to the controller. The controller performs a weighting operation for the global and local color temperatures to obtain an operation result for adjusting the color temperature of the illumination source. A method for adjusting color temperature of a lighting apparatus of adjustable color temperature is also proposed.

26 Claims, 8 Drawing Sheets

(56) References Cited

U.S. PATENT DOCUMENTS

| | | |
|---|---|---|
| 8,569,969 B2 | 10/2013 | Moss |
| 8,593,082 B2 | 11/2013 | Liang et al. |
| 8,909,056 B2 | 12/2014 | Weaver |
| 8,912,728 B2 | 12/2014 | Seo |
| 8,912,734 B2 | 12/2014 | Melanson et al. |
| 8,922,124 B2 | 12/2014 | Reed et al. |
| 2005/0242742 A1* | 11/2005 | Cheang ............... H05B 33/086 315/149 |
| 2008/0215279 A1* | 9/2008 | Salsbury ............ H05B 33/0869 702/107 |
| 2010/0295456 A1* | 11/2010 | Ko .................... H05B 33/0869 315/154 |
| 2012/0001558 A1 | 1/2012 | Vos et al. |
| 2012/0306381 A1* | 12/2012 | Adler ........................ F21S 2/00 315/152 |
| 2014/0104831 A1 | 4/2014 | Beausoleil et al. |
| 2014/0184081 A1* | 7/2014 | Yeh .................... H05B 33/0824 315/122 |
| 2014/0210357 A1 | 7/2014 | Yan et al. |
| 2015/0170584 A1* | 6/2015 | Casper ................ G09G 3/3413 345/690 |
| 2016/0270189 A1* | 9/2016 | Kawamura ......... H05B 37/0281 |
| 2016/0286616 A1* | 9/2016 | van de Ven ........ H05B 33/0842 |

FOREIGN PATENT DOCUMENTS

| | | |
|---|---|---|
| EP | 2291058 | 3/2011 |
| WO | 2013022784 | 2/2013 |

OTHER PUBLICATIONS

Qi et al., "A LED Control System with Brightness and Color Temperature Adjustable," 2011 International Conference on Control, Automation and Systems Engineering (CASE), Jul. 2011, pp. 1-4.

Ackermann et al., "Control of LEDs," Conference Record of the 2006 IEEE Industry Applications Conference, 2006. 41st IAS Annual Meeting, Oct. 2006, pp. 2608-2615.

Miki et al., "Combination of Preferred Illuminance and Preferred Color Temperature for Work," 2013 IEEE International Conference on Systems, Man, and Cybernetics, Oct. 2013, pp. 4577-4582.

Athalye et al., "A Two-Stage LED Driver for High-Performance High-Voltage LED Fixtures," 2012 Twenty-Seventh Annual IEEE Applied Power Electronics Conference and Exposition (APEC), Feb. 2012, pp. 2385-2391.

"Search Report of Europe Counterpart Application", issued on Nov. 18, 2016, p. 1-p. 8, in which the listed references were cited.

* cited by examiner

LIGHTING APPARATUS OF ADJUSTABLE COLOR TEMPERATURE AND A METHOD FOR ADJUSTING COLOR TEMPERATURE THEREOF

CROSS-REFERENCE TO RELATED APPLICATION

This application claims the priority benefit of Taiwan application no. 104120343, filed on Jun. 24, 2015. The entirety of the above-mentioned patent application is hereby incorporated by reference herein and made a part of this specification.

TECHNICAL FIELD

The present disclosure relates to a lighting apparatus of adjustable color temperature and a method for adjusting color temperature thereof.

BACKGROUND

Currently, lighting apparatuses using organic light-emitting diodes as a luminescent source have occupied a large proportion in the consumer market. The lighting apparatuses using the organic light-emitting diodes as the luminescent source are advantageous for having a fabrication material not containing mercury, and capable of providing an illumination source without UV light. In comparison with lighting apparatuses using light-emitting diodes as an illumination source, a less-preferable uniformity of color light may be provided since the light-emitting diode is a spot light source incapable of providing an illumination source with a color temperature approximate to nature light. The organic light-emitting diode is a plane light source with a preferable uniformity of color light and suitable for illumination of nature light. On the other hand, because a brightness of the organic light-emitting diode is proportional to a driving current flowing through the organic light-emitting diode itself, changes in the driving current may also lead to variations in the color temperature of the illumination source. Accordingly, how to adjust the color temperature of the illumination source is important in the case where the brightness of the organic light-emitting diode must remain unchanged.

SUMMARY

The present disclosure provides a lighting apparatus of adjustable color temperature, in which a color temperature of an illumination source may be adaptively adjusted.

The present disclosure provides a method for adjusting color temperature, which is capable of adaptively adjusting an illumination color temperature of a lighting apparatus.

The lighting apparatus of adjustable color temperature according to the present disclosure includes a luminescent source, a controller and a detector. The luminescent source is configured to provide an illumination source. The controller is coupled to the luminescent source. The controller is configured to adjust a color temperature of the illumination source according to at least one of a global temperature and a local color temperature. The detector is coupled to the controller. The detector is configured to detect a color temperature of a location of the lighting apparatus, so as to provide the local color temperature to the controller. The controller performs a weighting operation for the global temperature and the local color temperature to obtain an operation result for adjusting the color temperature of the illumination source.

The method for adjusting color temperature according to the present disclosure is configured to adjust a color temperature of an illumination source provided by a lighting apparatus of adjustable color temperature. The method for adjusting color temperature includes: receiving a global color temperature from a cloud database; detecting a color temperature of a location of the lighting apparatus of adjustable color temperature by a detector to obtain a local color temperature; and adjusting the color temperature of the illumination source according to at least one of the global color temperature and the local color temperature, The step of adjusting the color temperature of the illumination source according to the at least one of the global color temperature and the local color temperature includes: performing a weighting operation for the global color temperature and the local color temperature to obtain an operation result for adjusting the color temperature of the illumination source.

Based on the above, according to the exemplary embodiments of the present disclosure, the controller of the lighting apparatus of adjustable color temperature may perform the weighting operation for the global color temperature and the local color temperature to obtain the operation result for adjusting the color temperature of the illumination source.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth to provide a thorough understanding of the disclosed embodiments. It will be apparent, however, that one or more embodiments may be practiced without these specific details. In other instances, well-known structures and devices are schematically shown to simplify the drawing.

Embodiments are provided below to describe the present disclosure in detail, though the present disclosure is not limited to the provided embodiments, and the provided embodiments can be suitably combined. The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." In addition, the term "signal" can mean a current, a voltage, a charge, a temperature, data or any one or multiple signals.

Figure 1:
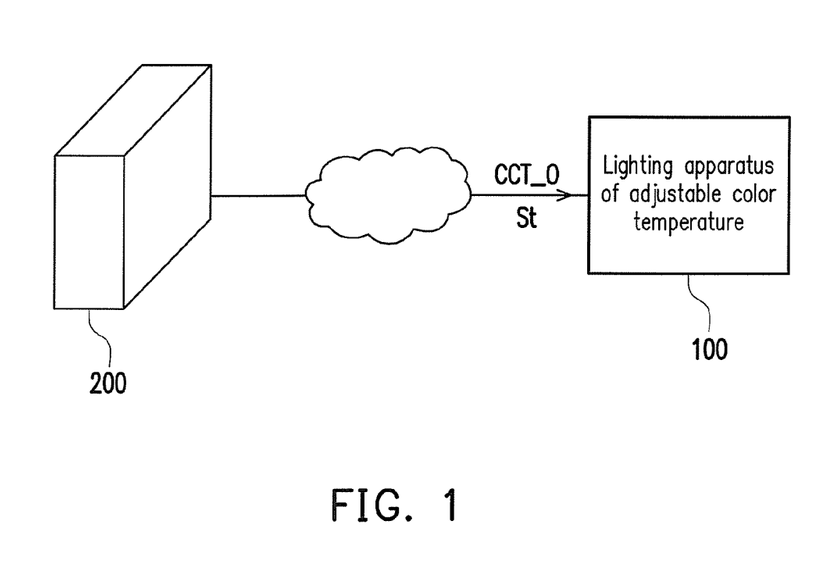
FIG. 1 illustrates a schematic diagram of a lighting apparatus of adjustable color temperature receiving data from a cloud database according to an exemplary embodiment of the present disclosure.
Figure 2:
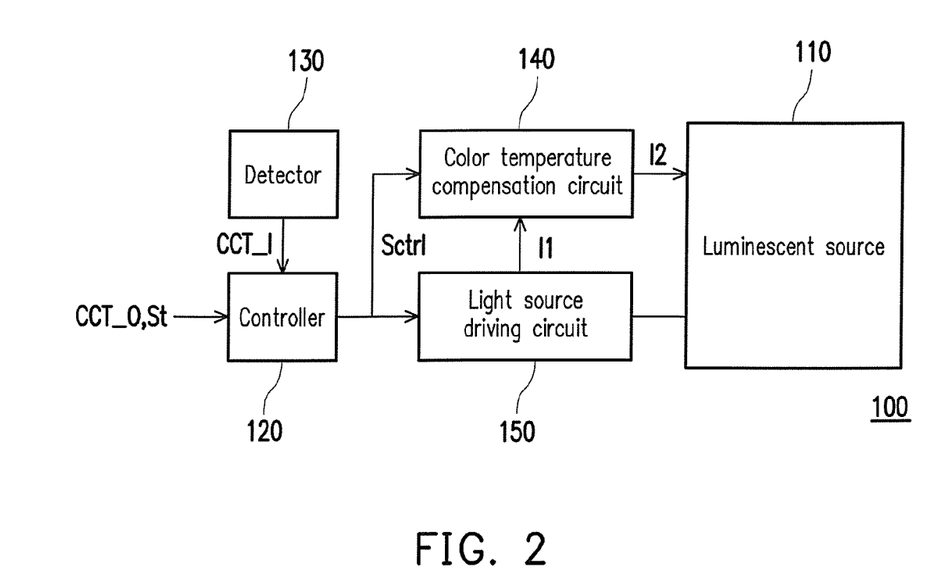
FIG. 2 illustrates a function block diagram of the lighting apparatus of adjustable color temperature according to an exemplary embodiment of the present disclosure.

FIG. 1 illustrates a schematic diagram of a lighting apparatus of adjustable color temperature receiving data from a cloud database according to an exemplary embodiment of the present disclosure. FIG. 2 illustrates a function block diagram of the lighting apparatus of adjustable color temperature according to an exemplary embodiment of the present disclosure. Referring to FIG. 1 and FIG. 2, a lighting apparatus 100 of adjustable color temperature includes a luminescent source 110, a controller 120, a detector 130, a color temperature compensation circuit 140 and a light source driving circuit 150. The luminescent source 110 includes one or more organic light-emitting diodes (not illustrated). For example, the organic light-emitting diodes are arranged in series to form a plurality of light-emitting diode strings, and the light-emitting diode strings are arranged in parallel to from a light-emitting diode array. The light source driving circuit 150 is coupled to the color temperature compensation circuit 140. The light source driving circuit 150 is configured to output a driving current I1 to the color temperature compensation circuit 140, and use its bypass current (i.e., a driving current I2) to drive the light-emitting diode array to provide an illumination source. In the present exemplary embodiment, the illumination source provided by the luminescent source 110 is a plane light source with uniform color light.

In the present exemplary embodiment, the detector 130 is coupled to the controller 120. The detector 130 is configured to detect a background color temperature of a location of the lighting apparatus 100 of adjustable color temperature, so as to provide a local color temperature CCT_I to the controller 120. In an exemplary embodiment, the lighting apparatus 100 of adjustable color temperature may be disposed outdoor, for example. Accordingly, the local color temperature CCT_I detected by the detector 130 may be, for example, a result combining color temperatures of outdoor sunlight and other ambient light sources. In an exemplary embodiment, the lighting apparatus 100 of adjustable color temperature may be disposed indoor, for example. Accordingly, the local color temperature CCT_I detected by the detector 130 may be, for example, a result combining color temperatures of the sunlight irradiated indoor, light sources provided by other lighting apparatuses and other background light sources. The present disclosure is not intended to limit a type of the local color temperature CCT_I, which is mainly used to indicate color temperature information detected by the detector 130.

In the present exemplary embodiment, the controller 120 receives data of a global color temperature CCT_O from a cloud database 200, for example. In an exemplary embodiment, the data of the global color temperature CCT_O is, for example, color temperature data currently or previously observed or recorded by a color temperature measuring institution (e.g., a local bureau of weather) in a specific region, which is stored in the cloud database 200. The data of the global color temperature CCT_O of the present exemplary embodiment includes (but not limited to) historical color temperature previously obtained while, before or after adjusting the color temperature of the lighting apparatus 100 of adjustable color temperature, or current color temperature data obtained while adjusting the color temperature of the lighting apparatus 100 of adjustable color temperature, or future color temperature data predicted according to the stored historical color temperature data and the current color temperature data. In an exemplary embodiment, in a scenario where the lighting apparatus 100 of adjustable color temperature is disposed indoor, the current color temperature data is, for example, the result combining color temperatures of outdoor sunlight and other ambient light sources. The present disclosure is not intended to limit a type of the global temperature CCT_O, which is mainly used to indicate color temperature information not detected by the detector 130. Further, in the present exemplary embodiment, the controller 120 may be electrically connected to the cloud database 200 in a wired manner or a wireless manner, which are not particularly limited in the present disclosure. In the exemplary embodiment in which the wireless manner is adopted for the electrical connection, the light apparatus 100 of adjustable color temperature may further include functional elements such as a wireless communication module, so as to establish a communication connection with the cloud database 200 to receive and transmit data.

In the present exemplary embodiment, the controller 120 is coupled to the luminescent source 110. The controller 120 is configured to adjust a color temperature of the illumination source according to at least one of the global color temperature CCT_O and the local color temperature CCT_I. For instance, the controller 120 performs a weighting operation for the global color temperature CCT_O and the local color temperature CCT_I to obtain an operation result for adjusting the color temperature of the illumination source. In the present exemplary embodiment, for example, the controller 120 performs the weighting operation for the global color temperature CCT_O and the local color temperature CCT_I by using a weighting formula to obtain the operation result. Further, in the present exemplary embodiment, the color temperature compensation circuit 140 is coupled to the luminescent source 110 and the controller 120. The color temperature compensation circuit 140 is controlled by the controller 120, and configured to adjust the color temperature of the illumination source, for example. The controller 120 outputs a control signal Sctrl to control the color temperature compensation circuit 140 to adjust the color temperature of the illumination source.

In the present exemplary embodiment, the controller 120 is, for example, a central processing unit (CPU) or other programmable microprocessors, a digital signal processor (DSP), a programmable controller, an application specific integrated circuits (ASIC), a programmable logic device (PLD) or other similar apparatuses.

Figure 3:
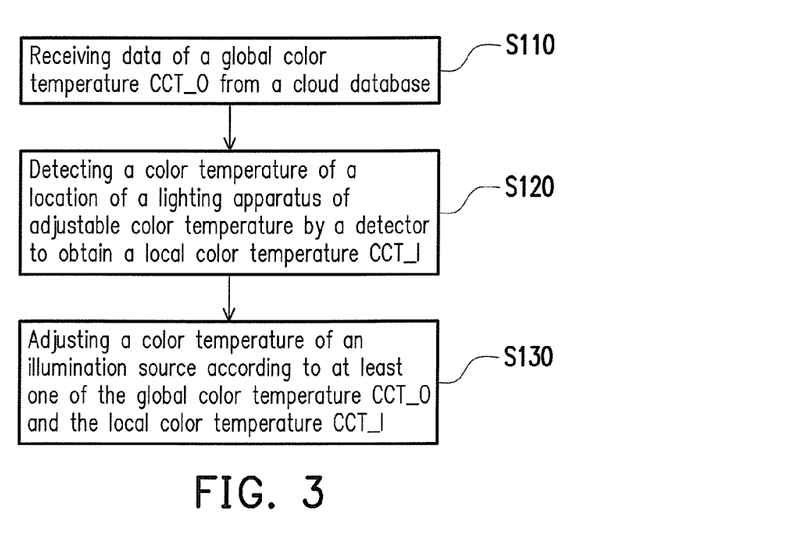
FIG. 3 is a flowchart illustrating steps of a method for adjusting color temperature according to an exemplary embodiment of the present disclosure.

FIG. 3 is a flowchart illustrating steps of a method for adjusting color temperature according to an exemplary embodiment of the present disclosure. Referring to FIG. 1 to FIG. 3 together, for example, the method for adjusting color temperature of the present exemplary embodiment may at least be used to adjust the color temperature of the illumination source provided by the lighting apparatus 100 of adjustable color temperature of FIG. 2, but the present disclosure is not limited thereto. The method for adjusting color temperature of the present exemplary embodiment may also be applied to other light apparatuses of adjustable color temperature implemented by the same or similar concept.

In the present exemplary embodiment, in step S110, the controller 120 receives data of the global color temperature CCT_O from the cloud database 200. In step S120, the controller 120 detects a color temperature of a location of the lighting apparatus 100 of adjustable color temperature by using the detector 130 to obtain the local color temperature CCT_I. In step S130, the controller 120 adjusts the color temperature of the illumination source according to at least one of the global color temperature CCT_O and the local color temperature CCT_I. In the present exemplary embodiment, for example, the controller 120 performs a weighting operation for the global color temperature CCT_O and the local color temperature CCT_I to obtain an operation result for adjusting the color temperature of the illumination source in step S130. In the present exemplary embodiment, the controller 120 may adjust the color temperature of the illumination source according to both the global color temperature CCT_O and the local color temperature CCT_I. Alternatively, the controller 120 may adjust the color temperature of the illumination source according to the global color temperature CCT_O or the local color temperature CCT_I, which is not particularly limited in the present disclosure.

In addition, sufficient teaching, suggestion, and implementation illustration regarding the method for adjusting color temperature of the present exemplary embodiment may be obtained from the above embodiments depicted in FIG. 1 to FIG. 2, and thus related description thereof is not repeated hereinafter.

Figure 4:
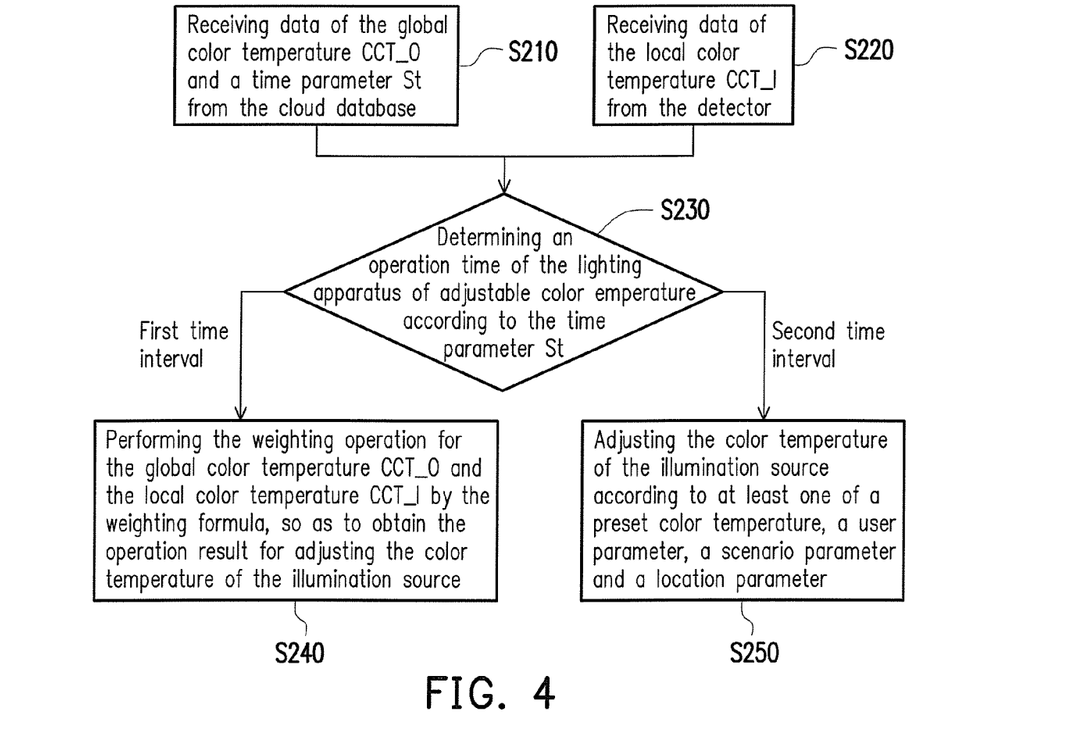
FIG. 4 is a flowchart illustrating steps of a method for adjusting color temperature according to another exemplary embodiment of the present disclosure.

FIG. 4 is a flowchart illustrating steps of a method for adjusting color temperature according to another exemplary embodiment of the present disclosure. Referring to FIG. 2 and FIG. 4 together, the method for adjusting color temperature of the present exemplary embodiment may at least be used to adjust the color temperature of the illumination source provided by the lighting apparatus 100 of adjustable color temperature of FIG. 2, but the present disclosure is not limited thereto. The method for adjusting color temperature of the present exemplary embodiment may also be applied to other light apparatuses of adjustable color temperature implemented by the same or similar concept.

In step S210, the controller 120 receives data of the global color temperature CCT_O and a time parameter St from the cloud database 200, for example. In step S220, the controller 120 receives data of the local color temperature CCT_I from the detector 130, for example. The local color temperature CCT_I is data obtained by the controller 120 after detecting a background color temperature of a current location of the light apparatus 100 of adjustable color temperature by using the detector 130, for example. In the present exemplary embodiment, an execution sequence of step S210 and step S220 is simply an example instead of limitations to the present disclosure. The controller 120 may receive the data of the global color temperature CCT_O and the time parameter St first before receiving the data of the local color temperature CCT_I. Alternatively, the controller 120 may also receive the local color temperature CCT_I first before receiving the global color temperature CCT_O and the time parameter St.

In step S230, the controller 120 determines an operation time of the lighting apparatus 100 of adjustable color temperature according to the time parameter St, for example. In an exemplary embodiment, the controller 120 does not need to receive the data of the time parameter St from the cloud database 200 but determines the operation time of the lighting apparatus 100 of adjustable color temperature according to a built-in time parameter, and the present disclosure is not limited to the above. In the present exemplary embodiment, for example, the controller 120 adjusts the color temperature of the illumination source by different methods according to the different operating time of the lighting apparatus 100 of adjustable color temperature. In the present exemplary embodiment, when the controller 120 determines that the operation time of the lighting apparatus 100 of adjustable color temperature falls within a first time interval, the controller 120 performs the weighting operation for the global color temperature CCT_O and the local color temperature CCT_I by using the weighting formula, so as to obtain the operation result for adjusting the color temperature of the illumination source in step S240. Alternatively, when the controller 120 determines that the operation time of the lighting apparatus 100 of adjustable color temperature falls within a second time interval, the controller 120 adjusts the color temperature of the illumination source according to at least one of a preset color temperature, a user parameter, a scenario parameter and a location parameter in step S250.

For instance, the first time interval may be, for example, daytime, and the second time interval may be, for example, nighttime. When the lighting apparatus 100 of adjustable color temperature operates in daytime, the controller 120 adjusts the color temperature of the illumination source by the method of step S240, for example. When the lighting apparatus 100 of adjustable color temperature operates in nighttime, the controller 120 adjusts the color temperature of the illumination source by the method of step S250, for example. In the present exemplary embodiment, although the operation time is distinguished by daytime and nighttime, but the present disclosure is not limited thereto. In an exemplary embodiment, the operation time of the lighting apparatus 100 of adjustable color temperature may also be distinguished by any two time periods in one day.

Further, in the present exemplary embodiment, the time parameter St received by the controller 120 from the cloud database 200 includes, for example, Greenwich Mean Time (GMT) of the location of the light apparatus 100 of adjustable color temperature, or time information in other standard time format. Based on the different location of the lighting apparatus 100 of adjustable color temperature, time lengths of daytime or nighttime may have a slight fluctuation. The controller 120 may obtain information regarding the slight fluctuation of the time lengths of daytime or nighttime from the time parameter St received from the cloud database 200, so as to adjust the color temperature by different methods. In an exemplary embodiment, the controller 120 may also obtain the current operation time of the lighting apparatus 100 of adjustable color temperature according to a built-in clock. In this example, the controller 120 does not need to receive the time parameter St from the cloud database 200.

In step S240, the controller 120 performs the weighting operation for the global color temperature CCT_O and the local color temperature CCT_I by using the weighting formula to obtain the operation result for adjusting the color temperature of the illumination source. In the present exemplary embodiment, the weighting formula includes, for example, a combination of mathematical operations involving a first weighting function f(O), a second weighting function f(I), the global color temperature CCT_O and the local color temperature CCT_I, as shown below:

$$CCT\_O \times f(O) + CCT\_I \times f(I) \quad \text{(the weighting formula)}$$

Herein, the first weighting function f(O) is a weight corresponding to the global color temperature CCT_O, and the second weighting function f(I) is a weight corresponding to the local color temperature CCT_I. Afore-mentioned weighting formula indicates that, after calculating a product of the first weighting function f(O) and the global color temperature CCT_O and a product of the second eight function f(I) and the local color temperature CCT_I respectively, the controller 120 calculates a sum of the two products to obtain the operation result.

In the present exemplary embodiment, although the mathematical operations in the weighting formula are described by using an arithmetic operation with multiplication and addition, but the present disclosure is not limited thereto. In other embodiments, the mathematical operations may also include other mathematical operations such as other arithmetic operations or matrix operations.

In the present exemplary embodiment, the first weighting function f(O) and the second weighting function f(I) may be determined according to at least one of a constant, a color coordinate transformation matrix, a time parameter, a user parameter, a scenario parameter and a location parameter. The parameter for determining the first weighting function f(O) may be identical to or different from the parameter for determining the second weighting function f(I). In the present exemplary embodiment, the first weighting function f(O) and the second weighting function f(I) may be correlated or not correlated. In an exemplary embodiment where the first weighting function f(O) and the second weighting function f(I) are correlated, the parameter for determining the first weighting function f(O) may be identical to the parameter for determining the second weighting function f(I). In an exemplary embodiment where the first weighting function f(O) and the second weighting function f(I) are not correlated, the parameter for determining the first weighting function f(O) is different from the parameter for determining the second weighting function f(I), for example.

In another exemplary embodiment where the first weighting function f(O) and the second weighting function f(I) are correlated, assuming that the first weighting function f(O) and the second weighting function f(I) are both constant functions and have a sum being 1, when the controller 120 sets the first weighting function f(O) as 0.6, the second weighting function f(I) is corresponding set as 0.4. This example indicates that the controller 120 sets the weighting formula as CCT_O×0.6+CCT_I×0.4. Alternatively, when the controller 120 sets the first weighting function f(O) as 0.35, the second weighting function f(I) is correspondingly set as 0.65. This example indicates that the controller 120 sets the weighting formula as CCT_O×0.65+CCT_I×0.35. In other words, in the present exemplary embodiment, the first weighting function f(O) may be determined according to the second weighting function f(I), and the second weighting function f(I) may also be determined according to the first weighting function f(O).

In the present exemplary embodiment, the color coordinate transformation matrix may be a transformation matrix for transforming between various color coordinates such as CIE 1931 RGB, CIE 1931 XYZ, CIE 1931 Lxy, CIE 1931 Lu'v', CIE 1976 L*a*b*.

The time parameter is, for example, the operation time of the lighting apparatus 100 of adjustable color temperature. For instance, the operation time of the lighting apparatus 100 of adjustable color temperature may include an interval from the morning to the noon and an interval from the noon to the afternoon. Based on the different operating time, the first weighting function f(O) and the second weighting function f(I) may be adjusted accordingly. In an exemplary embodiment, the color temperature correspondingly increases with elapse of time in the morning, and the color temperature correspondingly decreases with elapse of time in the afternoon. Based on the above, the lighting apparatus 100 of adjustable color temperature may correspondingly adjust the first weighting function f(O) or the second weighting function f(I).

Further, an exemplary embodiment in which the first weighting function f(O) and the second weighting function f(I) are determined according to a look-up table of the time parameter is shown by Table 1 below:

TABLE 1

| Time parameter | f(O) | f(I) |
| --- | --- | --- |
| 12:00 p.m. to 7:00 a.m. | The weighting operation is not performed, and instead, the color temperature of the illumination source is adjusted according to at least one of the preset color temperature, the user parameter, the scenario parameter and the location parameter | The weighting operation is not performed, and instead, the color temperature of the illumination source is adjusted according to at least one of the preset color temperature, the user parameter, the scenario parameter and the location parameter |
| 7:00 a.m. to 8:00 a.m. | 0.6 | 0 |
| 8:00 a.m. to | 0.65 | 0 |

TABLE 1-continued

| Time parameter | f(O) | f(I) |
|---|---|---|
| 9:00 a.m. | | |
| 9:00 a.m. to 1:00 p.m. | 0.7 | 0 |
| 1:00 p.m. to 3:00 p.m. | (1 − 0.1) | 0 |
| 3:00 p.m. to 5:00 p.m. | (1 − 0.3) | 0 |
| 5:00 p.m. to 12:00 p.m. | (1 − 0.5) | 0 |

As shown in Table 1, in this example, in each of the time periods excluding the time period of 12:00 p.m. to 7:00 a.m., the second weighting function f(I) is set as 0, which indicates that the controller 120 takes in consideration of the influences from the global color temperature CCT_O to the color temperature of the illumination source while performing the weighting operation for the global color temperature CCT_O and the local color temperature CCT_I by using the weighting formula.

The location parameter indicates a location of lighting apparatus 100 of adjustable color temperature, which may be determined based on different latitudes, for example. For instance, the location of the lighting apparatus 100 of adjustable color temperature may locate at the equator zone, the temperate zones or the frigid zones. Based on the different location, the first weighting function f(O) and the second weighting function f(I) may be adjusted accordingly.

Further, an exemplary embodiment in which the first weighting function f(O) and the second weighting function f(I) are determined according to a look-up table of the location parameter is shown by Table 2 below:

TABLE 2

| | Location parameter | f(O) | f(I) |
|---|---|---|---|
| High latitude | Zone from 66.5 degrees to 90 degrees north and zone from 66.5 degrees to 90 degrees south | 1 | 0 |
| Middle latitude | Zone from 23.5 degrees to 66.5 degrees north and zone from 23.5 degrees to 66.5 degrees south | 1 + 0.2 | 0 |
| Low latitude | Zone from 23.5 degrees north to 23.5 degrees south | 1 + 0.4 | 0 |

As shown in Table 2, in this example, each second weighting function f(I) is set as 0, which indicates that the controller 120 takes in consideration of the influences from the global color temperature CCT_O to the color temperature of the illumination source while performing the weighting operation for the global color temperature CCT_O and the local color temperature CCT_I by using the weighting formula.

The user parameter includes, for example, various information of a user such as a lifestyle, a habit, a preference, and the first weighting function f(O) and the second weighting function f(I) may be adjusted according to said various information of the user. For instance, the user may be in a light sleep state at 7 o'clock in the morning so the first weighting function f(O) is set as 0.3 and the second weighting function f(I) is set as 0, for example. The user may have the breakfast at 8 o'clock in the morning so the first weighting function f(O) is set as 0.7 and the second weighting function f(I) is set as 0, for example. For instance, the user may be working at 9 o'clock in the morning so the first weighting function f(O) is set as 1 and the second weighting function f(I) is set as 0, for example. Alternatively, in an exemplary embodiment, the user may also directly select a specific color temperature as the illumination for the lifestyle.

The scenario parameter includes, for example, information of a usage scenario of the lighting apparatus 100 of adjustable color temperature. For instance, the lighting apparatus 100 of adjustable color temperature may be used in different usage scenarios such as a stage, a theater, an exhibition, and the first weighting function f(O) or the second weighting function f(I) may be adjusted accordingly.

In the present exemplary embodiment, for example, the constant, the color coordinate transformation matrix, the time parameter, the user parameter, the scenario parameter and the location parameter may be obtained from the cloud database 200, or stored in the controller 120, or directly inputted into the controller 120 by the user.

On the other hand, in step S250, the controller 120 may adjust the color temperature of the illumination source according to at least one of the preset color temperature, the user parameter, the scenario parameter and the location parameter, for example. For instance, the location parameter indicates the location of lighting apparatus 100 of adjustable color temperature, which may be determined based on different latitudes. For instance, the location of the lighting apparatus 100 of adjustable color temperature may locate at the equator zone, the temperate zones or the frigid zones. Based on the different location, the color temperature of the illumination source may be adjusted accordingly. The user parameter includes, for example, various information of the user such as the lifestyle, the habit, the preference, and the color temperature of the illumination source may be adjusted according to said various information of the user. The scenario parameter includes, for example, information of a usage scenario of the lighting apparatus 100 of adjustable color temperature. For instance, the lighting apparatus 100 of adjustable color temperature may be used in different usage scenarios such as the stage, the theater, the exhibition, and the color temperature of the illumination source may be adjusted accordingly. In the present exemplary embodiment, the preset color temperature, the user parameter, the scenario parameter and the location parameter may be, for example, obtained from the cloud database 200, or stored in the controller 120, or directly inputted into the controller 120 by the user.

In addition, sufficient teaching, suggestion, and implementation illustration regarding the method for adjusting color temperature of the present exemplary embodiment may be obtained from the above embodiments depicted in FIG. 1 to FIG. 3, and thus related description thereof is not repeated hereinafter.

Figure 5:
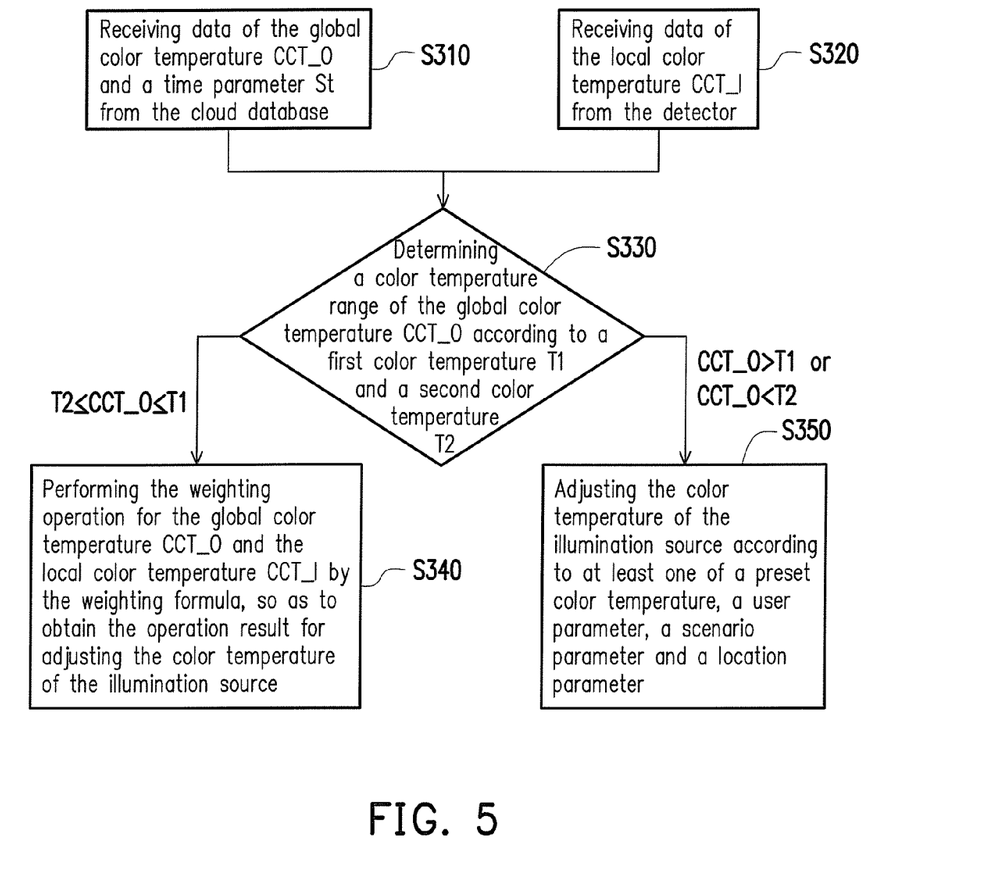
FIG. 5 is a flowchart illustrating steps of a method for adjusting color temperature according to another exemplary embodiment of the present disclosure.

FIG. 5 is a flowchart illustrating steps of a method for adjusting color temperature according to another exemplary embodiment of the present disclosure. Referring to FIG. 2 and FIG. 5 together, a method for adjusting color temperature of the present exemplary embodiment is similar to the method for adjusting color temperature of FIG. 4.

According to the present exemplary embodiment, in step S330, the controller 120 determines a color temperature range of the global color temperature CCT_O according to a first color temperature T1 and a second color temperature T2, for example. In the present exemplary embodiment, for example, the controller 120 adjusts the color temperature of the illumination source by different methods according to the different color temperature range of the global color temperature CCT_O. In the present exemplary embodiment, when the controller 120 determines that the global color temperature CCT_O falls between the first color temperature T1 and the second color temperature T2, the controller 120 performs the weighting operation for the global color temperature CCT_O and the local color temperature CCT_I by using the weighting formula, so as to obtain the operation result for adjusting the color temperature of the illumination source in step S340. Alternatively, when the controller 120 determines that the global color temperature CCT_O is greater than the first color temperature T1 or less than the second color temperature T2, the controller 120 adjusts the color temperature of the illumination source according to at least one of a preset color temperature, a user parameter, a scenario parameter and a location parameter in step S350.

In this exemplary embodiment, the first color temperature T1 is greater than the second color temperature T2. The first color temperature T1 and the second color temperature T2 are determined according to the type of color coordinate and the characteristic of the organic light-emitting diodes of the lighting apparatus 100 of adjustable color temperature, for example. In an exemplary embodiment, in the color coordinate CIE 1932, the first color temperature T1 is, for example, 7000K, and the second color temperature T2 is, for example, 2000K, but the present disclosure is not limited thereto.

In addition, sufficient teaching, suggestion, and implementation illustration regarding the method for adjusting color temperature of the present exemplary embodiment may be obtained from the above embodiments depicted in FIG. 1 to FIG. 4, and thus related description thereof is not repeated hereinafter.

Figure 6:
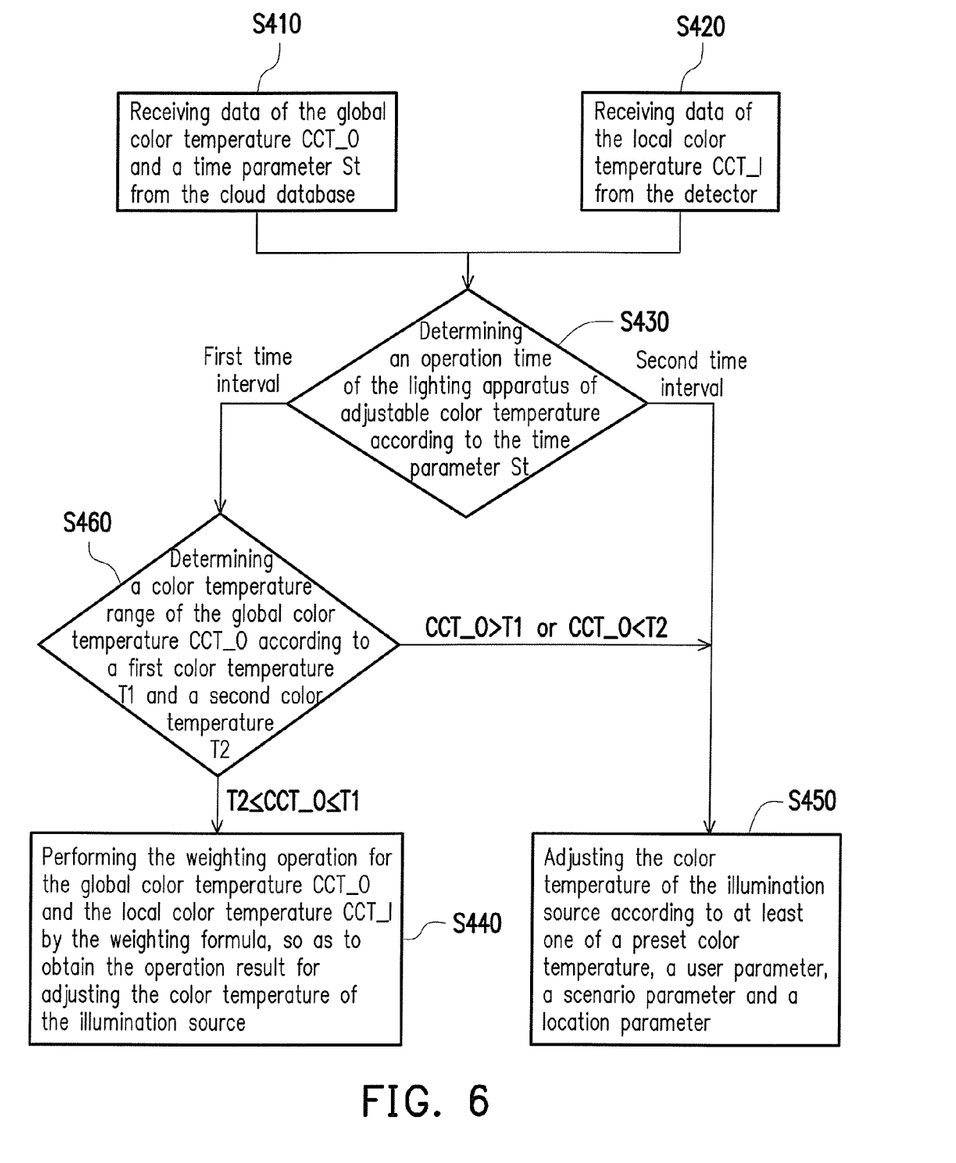
FIG. 6 is a flowchart illustrating steps of a method for adjusting color temperature according to another exemplary embodiment of the present disclosure.

FIG. 6 is a flowchart illustrating steps of a method for adjusting color temperature according to another exemplary embodiment of the present disclosure. Referring to FIG. 2 and FIG. 6 together, a method for adjusting color temperature of the present exemplary embodiment is similar to the method for adjusting color temperature of FIG. 4, a major difference between the two is that the method for adjusting color temperature of the present exemplary embodiment further includes step S460.

In step S430, the controller 120 determines an operation time of the lighting apparatus 100 of adjustable color temperature according to the time parameter St, for example. In the present exemplary embodiment, for example, the controller 120 adjusts the color temperature of the illumination source by different methods according to the different operating time of the lighting apparatus 100 of adjustable color temperature. In the present exemplary embodiment, when the controller 120 determines that the operation time of the lighting apparatus 100 of adjustable color temperature falls within a first time interval, the controller 120 determines the color temperature range of the global color temperature CCT_O according to the first color temperature T1 and the second color temperature T2 in step S460. In step S460, when the controller 120 determines the global color temperature CCT_O falls between the first color temperature T1 and the second color temperature T2, the controller 120 performs the weighting operation for the global color temperature CCT_O and the local color temperature CCT_I by using the weighting formula, so as to obtain the operation result for adjusting the color temperature of the illumination source in step S440. Alternatively, in step S460, when the controller 120 determines that the global color temperature CCT_O is greater than the first color temperature T1 or less than the second color temperature T2, the controller 120 adjusts the color temperature of the illumination source according to at least one of a preset color temperature, a user parameter, a scenario parameter and a location parameter in step S450.

On the other hand, in step S430, when the controller 120 determines that the operation time of the lighting apparatus 100 of adjustable color temperature falls within a second time interval, the controller 120 adjusts the color temperature of the illumination source according to at least one of a preset color temperature, a user parameter, a scenario parameter and a location parameter in step S450.

In addition, sufficient teaching, suggestion, and implementation illustration regarding the method for adjusting color temperature of the present exemplary embodiment may be obtained from the above embodiments depicted in FIG. 1 to FIG. 5, and thus related description thereof is not repeated hereinafter.

Figure 7:
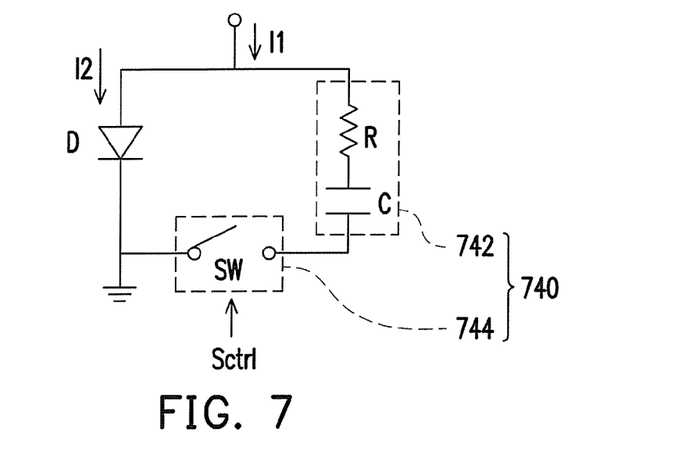
FIG. 7 illustrates a schematic diagram of a color temperature compensation circuit according to an exemplary embodiment of the present disclosure.

In the embodiment of FIG. 2, for example, the controller 120 outputs the control signal Sctrl to control the color temperature compensation circuit 140 to adjust the color temperature of the illumination source. FIG. 7 illustrates a schematic diagram of a color temperature compensation circuit according to an exemplary embodiment of the present disclosure. Referring to FIG. 2 and FIG. 7, a color temperature compensation circuit 740 of the present exemplary embodiment includes a compensation element module 742 and a switch element module 744. The switch element module 744 is coupled between the compensation element module 742 and an organic light-emitting diode D. The compensation element module 742 generates different impedance values according to different AC frequencies, and whether the switch element module 744 is turned on or not turned on may change a bypass current state of the driving current I1, namely, change an intensity of the driving current I2. In the present exemplary embodiment, the compensation element module 742 includes a group of a resistor R and a capacitor C coupled in series. The switch element module 744 includes a switch element SW. The controller 120 controls the switch element SW of the switch element module 744 by the control signal Sctrl, so as to select to turn-on or not to turn-on the switch element SW to adjust the color temperature of the illumination source.

In the present exemplary embodiment, the light source driving circuit 150 is configured to output the driving current I1 to the color temperature compensation circuit 140, so as to use the bypass current (i.e., the driving current I2) to drive the organic light-emitting diode D of the luminescent source 110 to provide the illumination source. The controller 120 controls the switch element SW to be turned on or not be turned on by the control signal Sctrl to adjust the intensity of the driving current I2 flowed into the organic light-emitting diode D, so as to adjust the color temperature of the illumination source. In the present exemplary embodiment, although a cathode of the organic light-emitting diode D coupled to a ground voltage is used as an example for description, the present disclosure is not limited thereto. In other embodiments, the cathode of the organic light-emitting diode D may also be coupled to a negative voltage with is relatively low in the system. In the present exemplary embodiment, when the switch element SW is turned on, a driving load of the light source driving circuit 150 includes the group of the resistor R and the capacitor C coupled in series and coupled in parallel with the organic light-emitting diode D. When the switch element SW is not turned on, the driving load of the light source driving circuit 150 includes the organic light-emitting diode D. In the two states where the switch element SW is turned on or not turned on, because the driving loads of the light source driving circuits 150 are not identical, the bypass current state of the driving current I1 (i.e., the intensity of the driving current I2) may be adjusted based on different electrical impedances of the driving loads, such that the color temperature of the illumination source is also changed accordingly. In the present exemplary embodiment, the controller 120 controls the switch element SW to be turned on to decrease the color temperature of the illumination source. The controller 120 controls the switch element SW not to be turned on to increase the color temperature of the illumination source.

Figure 8:
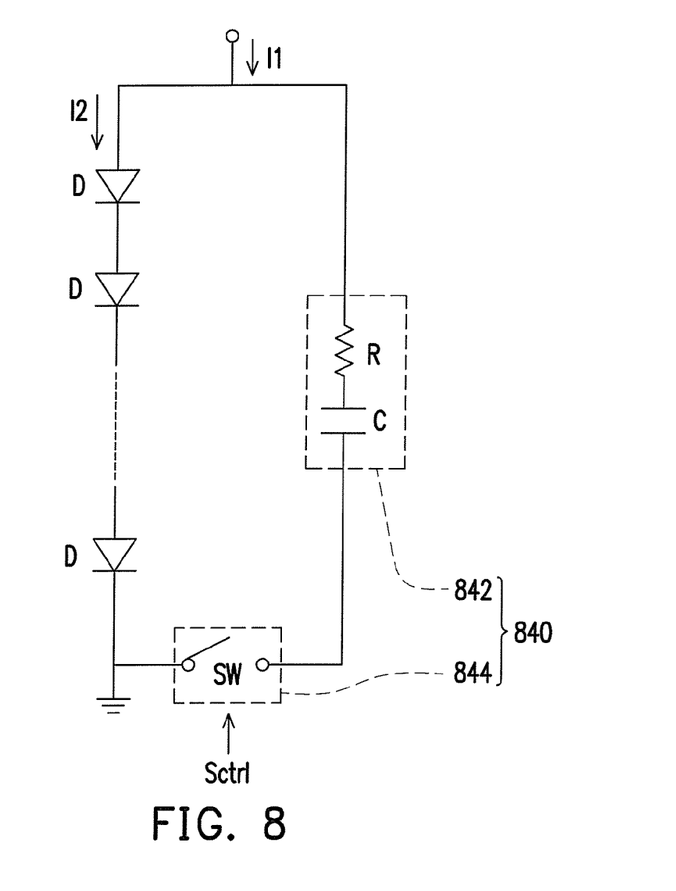
FIG. 8 illustrates a schematic diagram of a color temperature compensation circuit according to another exemplary embodiment of the present disclosure.

FIG. 8 illustrates a schematic diagram of a color temperature compensation circuit according to another exemplary embodiment of the present disclosure. Referring to FIG. 7 and FIG. 8, a color temperature compensation circuit 840 of the present exemplary embodiment is similar to the color temperature compensation circuit 740 of FIG. 7, and a major difference between the two is that, what coupled in parallel with to the compensation element module 742 is an organic light-emitting diode string that includes a plurality of organic light-emitting diodes D connected in series. In the present exemplary embodiment, the controller 120 controls the switch element SW to be turned on or not to be turned on by the control signal Sctrl to adjust the color temperature of the illumination source. Sufficient teaching, suggestion, and implementation illustration regarding an operating method of the color temperature compensation circuit 840 of the present exemplary embodiment may be obtained from the embodiment depicted in FIG. 7, and thus related description thereof is not repeated hereinafter.

Figure 9:
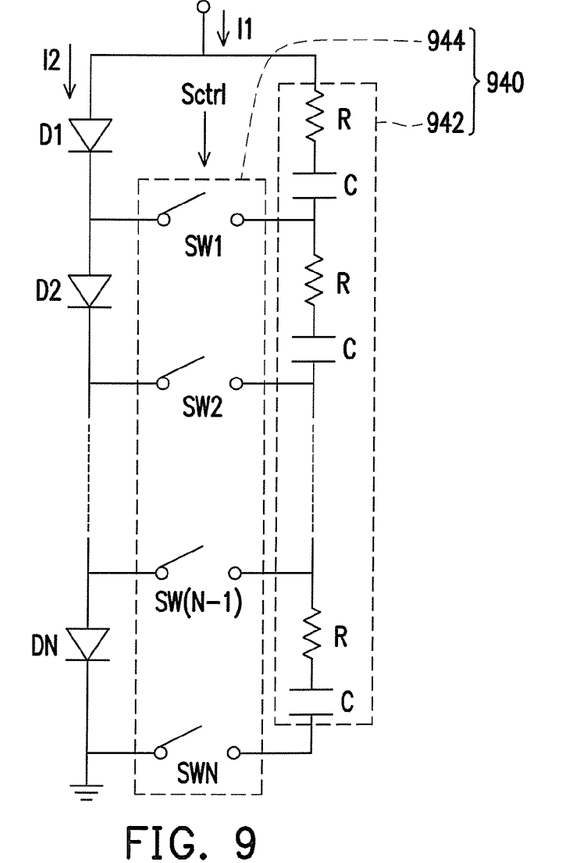
FIG. 9 illustrates a schematic diagram of a color temperature compensation circuit according to another exemplary embodiment of the present disclosure.

FIG. 9 illustrates a schematic diagram of a color temperature compensation circuit according to another exemplary embodiment of the present disclosure. Referring to FIG. 7 and FIG. 9, a color temperature compensation circuit 940 of the present exemplary embodiment is similar to the color temperature compensation circuit 740 of FIG. 7, and major differences between the two are provided as follows.

In the present exemplary embodiment, a compensation element module 942 includes multiple groups of the resistor R and the capacitor C coupled in series. The switch element module 944 includes a plurality of switch elements SW1 to SWN coupled in parallel. In this example, each of a plurality of organic light-emitting diodes D1 to DN of the organic light-emitting diode string is disposed with one group of the resistor R and the capacitor C coupled in series. The controller 120 controls the switch elements SW1 to SWN to be turned on or not to be turned on by the control signal Sctrl. For instance, there can be various configurations based on whether each of the switch elements SW1 to SWN is turned on or not turned on. For instance, when all the switch elements SW1 to SWN are not turned on, the driving current I1 is not flowed into the compensation element module 942 but served entirely as the driving current I2 to drive the organic light-emitting diodes D1 to DN. When the switch element SW1 is turned on while the switch elements SW2 to SWN are not turned on, the organic light-emitting diode D1 forms a parallel configuration with a first group of the resistor R and the capacitor C coupled in series, so as to adjust the intensity of the driving current I2 flowed into the organic light-emitting diode D1. The other organic light-emitting diodes D2 to DN coupled in series form another parallel configuration with the other groups of the resistor R and the capacitor C coupled in series. The other combinations regarding whether the switch elements SW1 to SWN are turned on or not turned on may be deduced by analogy, which are omitted hereinafter. Therefore, in the present exemplary embodiment, one or more switch elements among the switch elements SW1 to SWN may be turned on or not turned on at the same time to adjust the color temperature of the illumination source, which are not particularly limited in the present disclosure. In addition, sufficient teaching, suggestion, and implementation illustration regarding an operating method of the color temperature compensation circuit 940 of the present exemplary embodiment may be obtained from the embodiment depicted in FIG. 7, and thus related description thereof is not repeated hereinafter.

Figure 10:
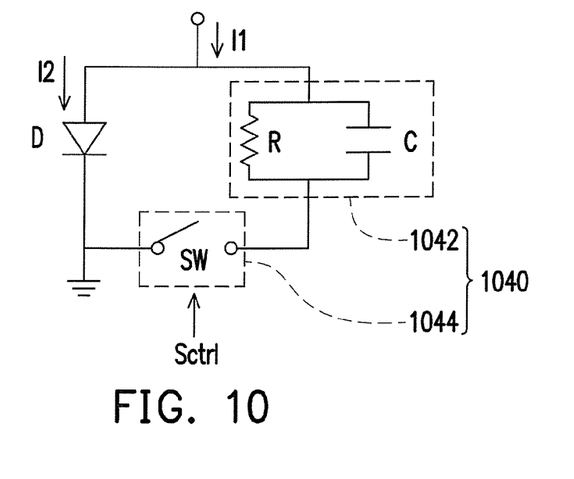
FIG. 10 illustrates a schematic diagram of a color temperature compensation circuit according to another exemplary embodiment of the present disclosure.

FIG. 10 illustrates a schematic diagram of a color temperature compensation circuit according to another exemplary embodiment of the present disclosure. Referring to FIG. 7 and FIG. 10, a color temperature compensation circuit 1040 of the present exemplary embodiment is similar to the color temperature compensation circuit 740 of FIG. 7, and a major difference between the two is that, the color temperature compensation circuit 1040 includes the group of the resistor R and the capacitor C connected in parallel. In the present exemplary embodiment, the controller 120 controls the switch element SW to be turned on or not to be turned on by the control signal Sctrl to adjust the color temperature of the illumination source. In addition, sufficient teaching, suggestion, and implementation illustration regarding an operating method of the color temperature compensation circuit 1040 of the present exemplary embodiment may be obtained from the embodiment depicted in FIG. 7, and thus related description thereof is not repeated hereinafter.

In the exemplary embodiments of FIG. 7 and FIG. 10, the compensation element modules are illustrated as a combination of two elements including the resistor and the capacitor connected in series or connected in parallel, but the present disclosure is not limited thereto. In other exemplary embodiments, the compensation element module includes, for example, a combination of two elements including a capacitor and an inductor connected in series or connected in parallel, so as to reduce power consumption of the compensation element module.

FIG. 11 to FIG. 14 illustrate schematic diagrams of color temperature compensation circuits according to different exemplary embodiments of the present disclosure.

Figure 11:
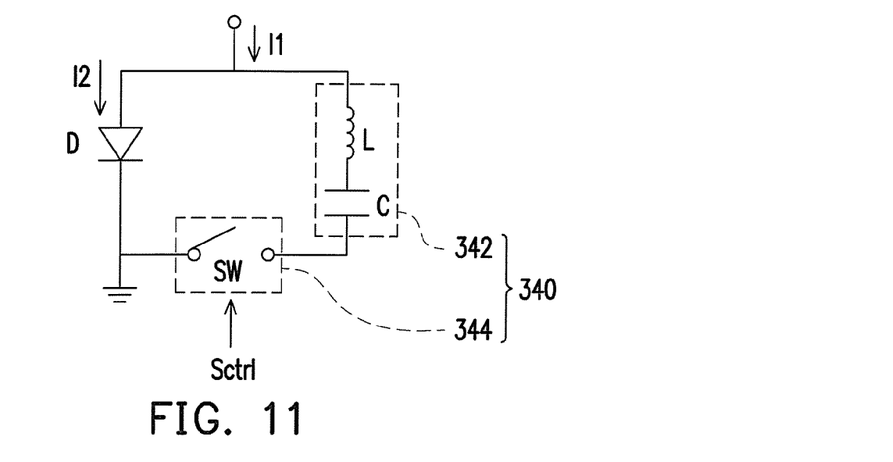
FIG. 11 illustrates a schematic diagram of a color temperature compensation circuit according to another exemplary embodiment of the present disclosure.

In the exemplary embodiment of FIG. 11, a compensation element module 342 includes a group of an inductor L and a capacitor C coupled in series. The switch element module 344 includes a switch element SW. The controller 120 controls the switch element SW of the switch element module 344 by the control signal Sctrl, so as to select to turn-on or not to turn-on the switch element SW to adjust the color temperature of the illumination source.

Figure 12:
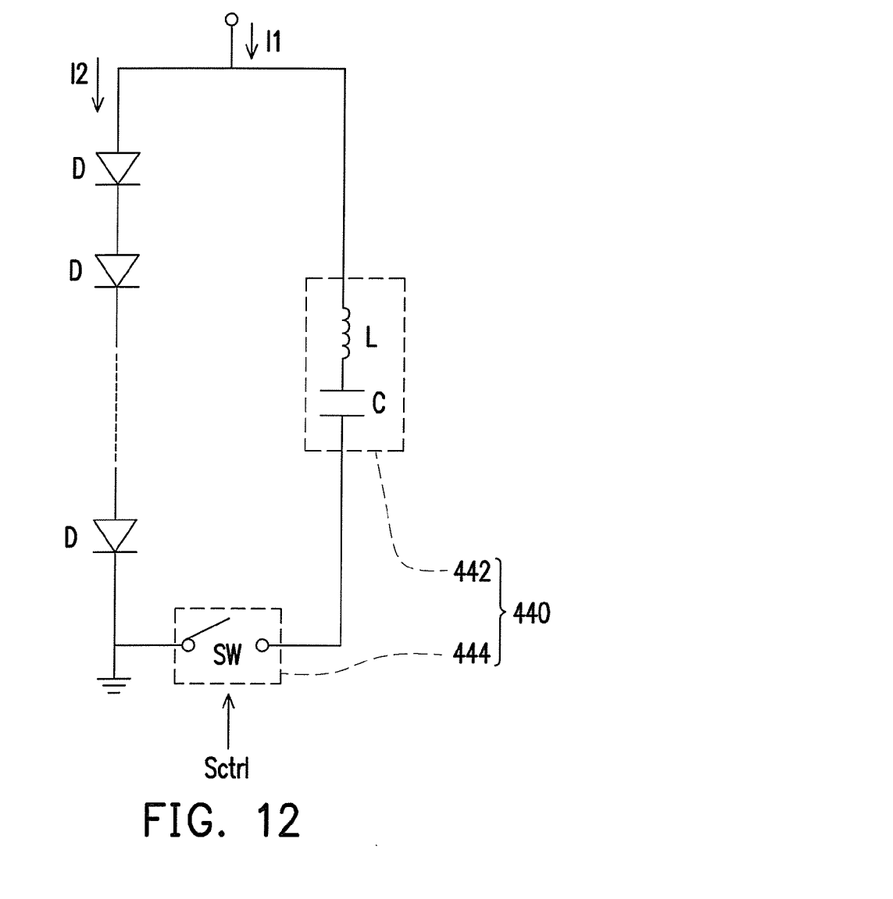
FIG. 12 illustrates a schematic diagram of a color temperature compensation circuit according to another exemplary embodiment of the present disclosure.

In the exemplary embodiment of FIG. 12, a compensation element module 442 includes a group of an inductor L and a capacitor C coupled in series. What coupled in parallel with the compensation element module 442 is an organic light-emitting diode string which includes a plurality of organic light-emitting diodes D coupled in series. In the present exemplary embodiment, the controller 120 controls the switch element SW to be turned on or not to be turned on by the control signal Sctrl to adjust the color temperature of the illumination source.

Figure 13:
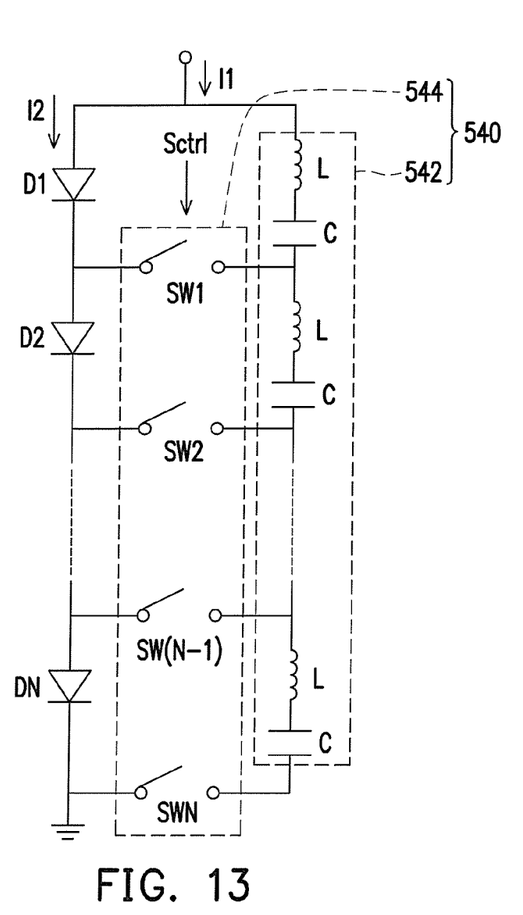
FIG. 13 illustrates a schematic diagram of a color temperature compensation circuit according to another exemplary embodiment of the present disclosure.

In the exemplary embodiment of FIG. 13, a compensation element module 942 includes multiple groups of the inductor L and the capacitor C coupled in series. The switch element module 744 includes a plurality of switch elements SW1 to SWN coupled in parallel. In this example, each of a plurality of organic light-emitting diodes D1 to DN of the organic light-emitting diode string is disposed with one group of the inductor L and the capacitor C coupled in series. The controller 120 controls the switch elements SW1 to SWN to be turned on or not to be turned on by the control signal Sctrl to adjust the color temperature of the illumination source.

Figure 14:
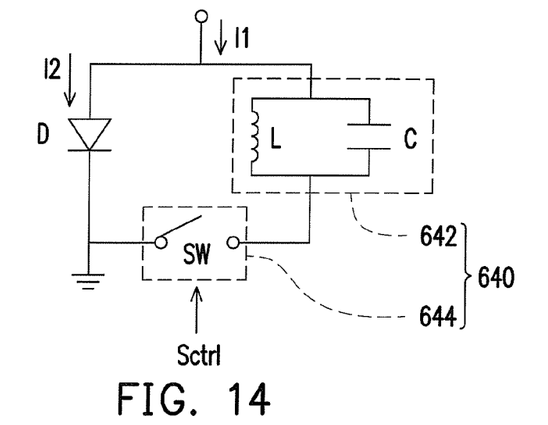
FIG. 14 illustrates a schematic diagram of a color temperature compensation circuit according to another exemplary embodiment of the present disclosure.

In the exemplary embodiment of FIG. 14, a compensation element module 642 includes a group of the inductor L and the capacitor C coupled in parallel. The switch element module 644 includes a switch element SW. The controller 120 controls the switch element SW of the switch element module 644 by the control signal Sctrl, so as to select to turn-on or not to turn-on the switch element SW to adjust the color temperature of the illumination source.

In addition, sufficient teaching, suggestion, and implementation illustration regarding operating methods of the color temperature compensation circuits of the exemplary embodiments depicted in FIG. 11 to FIG. 14 may be obtained from the embodiments depicted in FIG. 7 to FIG. 10, and thus related description thereof is not repeated hereinafter.

In the exemplary embodiments of FIG. 11 and FIG. 14 among the exemplary embodiments of the present disclosure, the compensation element modules are illustrated as the combination of two elements including the inductor and the capacitor connected in series or connected in parallel, but the present disclosure is not limited thereto. In other exemplary embodiments, for example, the compensation element module includes a combination of at least two elements among a resistor, a capacitor and an inductor, which are connected in series or connected in parallel. Sufficient teaching, suggestion, and implementation illustration regarding operating methods of the color temperature compensation circuit including different combinations of the resistor, the capacitor and the inductor may be obtained from the embodiments depicted in FIG. 7 to FIG. 14, and thus related description thereof is not repeated hereinafter.

Further, in the exemplary embodiments of the present disclosure, the method for adjusting color temperature detects the color temperature of the luminescent source 110 by using the detector 130. The controller 120 controls the switches (e.g., those illustrated in FIG. 7 to FIG. 11) of the color temperature compensation circuit 140 according to a detection result of the detector 130 to compensate the color temperature of the luminescent source 110. Accordingly, in the exemplary embodiments of the present disclosure, the light source driving circuit 150 includes, for example, a driving circuit for driving a light-emitting diode light source, an organic light-emitting diode light source or other similar light sources. Furthermore, in an exemplary embodiment, the light source driving circuit 150 may also be designed to include a current detector, which is configured to detect a feedback current of the luminescent source 110. Subsequently, the light source driving circuit 150 may transmit a feedback message to the controller 120 so as to perform a color temperature compensation.

In summary, according to the exemplary embodiments of the present disclosure, with respect to the weighting operation, the local color temperature is mainly the color temperature of the location of the lighting apparatus of adjustable color temperature detected by using the detector, which may be used to compensate the color temperature of the illumination source. The global color temperature is mainly the color temperature data collected from the cloud database. The controller performs the weighting operation for the global color temperature and the local color temperature to obtain the operation result for adjusting the color temperature of the illumination source. With respect to the circuit structure, the combination of at least two elements among the resistor, the capacitor and the inductor is connected in parallel with the organic light-emitting diode to serve as the color temperature compensation circuit. The controller controls the color temperature compensation circuit according to the operation result of the weighting operation performed for the global color temperature and the local color temperature, so as to adjust the color temperature of the illumination source.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A lighting apparatus of adjustable color temperature, comprising:
 a luminescent source, configured to provide an illumination source;
 a controller, coupled to the luminescent source, and configured to adjust a color temperature of the illumination source according to at least one of a global color temperature and a local color temperature, wherein the controller receives the global color temperature from a cloud database; and
 a detector, coupled to the controller, and configured to detect a color temperature of a location of the lighting apparatus of adjustable color temperature, so as to provide the local color temperature to the controller,
 wherein the controller performs a weighting operation for the global color temperature and the local color temperature to obtain an operation result for adjusting the color temperature of the illumination source,
 wherein the luminescent source comprises one or more organic light-emitting diodes, and the color temperature compensation circuit comprises:
 a compensation element module, coupled to the one or more organic light-emitting diodes, and configured to adjust the color temperature of the illumination source; and
 a switch element module, coupled between the compensation element module and the one or more organic light-emitting diodes,
 wherein the controller controls the switch element module to be turned on or not be turned on by the control signal to determine an impedance value of the compensation element module, so as to adjust the color temperature of the illumination source.

2. The lighting apparatus of adjustable color temperature of claim 1, further comprising:
a color temperature compensation circuit, coupled to the luminescent source and the controller, and configured to adjust the color temperature of the illumination source,
wherein the controller outputs a control signal to control the color temperature compensation circuit to adjust the color temperature of the illumination source.

3. The lighting apparatus of adjustable color temperature of claim 1, wherein the controller controls the switch element module to be turned on to decrease the color temperature of the illumination source, and the controller controls the switch element module not to be turned on to increase the color temperature of the illumination source.

4. The lighting apparatus of adjustable color temperature of claim 1, wherein the compensation element module comprises a combination of at least two elements among a resistor, a capacitor and an inductor, which are connected in series or connected in parallel.

5. The lighting apparatus of adjustable color temperature of claim 1, wherein the one or more organic light-emitting diodes are driven by a driving current to provide the illumination source, and the controller controls the switch element module to be turned on or not to be turned on by the control signal to adjust an intensity of the driving current flowed into the luminescent source, so as to adjust the color temperature of the illumination source.

6. The lighting apparatus of adjustable color temperature of claim 5, further comprising:
a light source driving circuit, coupled to the color temperature compensation circuit, and configured to output the driving current to the color temperature compensation circuit to drive the one or more organic light-emitting diodes to provide the illumination source.

7. The lighting apparatus of adjustable color temperature of claim 1, wherein the controller performs the weighting operation for the global color temperature and the local color temperature by a weighting formula,
wherein the weighting formula comprises a combination of mathematical operations involving a first weighting function, a second weighting function, the global color temperature and the local color temperature.

8. The lighting apparatus of adjustable color temperature of claim 7, wherein the first weighting function is determined according to at least one of the second weighting function, a constant, a color coordinate transformation matrix, a time parameter, a user parameter, a scenario parameter and a location parameter, and the second weighting function is determined according to at least one of the first weighting function, the constant, the color coordinate transformation matrix, the time parameter, the user parameter, the scenario parameter and the location parameter.

9. The lighting apparatus of adjustable color temperature of claim 7, wherein the controller determines a color temperature range of the global color temperature according to a first color temperature and a second color temperature.

10. The lighting apparatus of adjustable color temperature of claim 9, wherein the controller performs the weighting operation for the global color temperature and the local color temperature by the weighting formula when the global color temperature falls between the first color temperature and the second color temperature, so as to obtain the operation result for adjusting the color temperature of the illumination source.

11. The lighting apparatus of adjustable color temperature of claim 10, wherein the controller adjusts the color temperature of the illumination source according to at least one of a preset color temperature, a user parameter, a scenario parameter and a location parameter when the global color temperature is greater than the first color temperature or less than the second color temperature.

12. The lighting apparatus of adjustable color temperature of claim 1, wherein the controller receives a time parameter from the cloud database to determine an operation time of the lighting apparatus of adjustable color temperature, and when the controller determines that the operation time of the lighting apparatus of adjustable color temperature falls within a first time interval, the controller performs the weighting operation for the global color temperature and the local color temperature to obtain the operation result for adjusting the color temperature of the illumination source.

13. The lighting apparatus of adjustable color temperature of claim 12, wherein when the controller determines that the operation time of the lighting apparatus of adjustable color temperature falls within a second time interval, the controller adjusts the color temperature of the illumination source according to at least one of a preset color temperature, a user parameter, a scenario parameter and a location parameter.

14. A method for adjusting color temperature, configured to adjust a color temperature of an illumination source provided by a lighting apparatus of adjustable color temperature, and comprising:
receiving a global color temperature from a cloud database;
detecting a color temperature of a location of the lighting apparatus of adjustable color temperature by a detector to obtain a local color temperature; and
adjusting the color temperature of the illumination source according to at least one of the global color temperature and the local color temperature,
wherein the step of adjusting the color temperature of the illumination source according to the at least one of the global color temperature and the local color temperature comprises:
performing a weighting operation for the global color temperature and the local color temperature to obtain an operation result for adjusting the color temperature of the illumination source,
wherein the lighting apparatus of adjustable color temperature comprises a luminescent source configured to provide the illumination source and comprising one or more organic light-emitting diodes, and the color temperature compensation circuit comprises a compensation element module and a switch element module,
wherein the step of outputting the control signal to control the color temperature compensation circuit to adjust the color temperature of the illumination source comprises:
controlling the switch element module to be turned on or not to be turned on, wherein the compensation element module is coupled to the one or more organic light-emitting diodes through the switch element module.

15. The method for adjusting color temperature of claim 14, wherein the step of adjusting the color temperature of the illumination source according to the at least one of the global color temperature and the local color temperature comprises:
outputting a control signal to control a color temperature compensation circuit to adjust the color temperature of the illumination source.

16. The method for adjusting color temperature of claim 14, wherein the step of controlling the switch element module to be turned on or not to be turned on comprises:
controlling the switch element module to be turned on to decrease the color temperature of the illumination source, or controlling the switch element module not to be turned on to increase the color temperature of the illumination source.

17. The method for adjusting color temperature of claim 14, wherein the compensation element module comprises a combination of at least two elements among a resistor a capacitor and an inductor, which are connected in series or connected in parallel.

18. The method for adjusting color temperature of claim 14, wherein the one or more organic light-emitting diodes are driven by a driving current to provide the illumination source, the step of controlling the switch element module to be turned on or not to be turned on comprises: controlling the switch element module to be turned on or not be turned on to adjust an intensity of the driving current flowed into the luminescent source, so as to adjust the color temperature of the illumination source.

19. The method for adjusting color temperature of claim 18, further comprising:
outputting the driving current to drive the one or more organic light-emitting diodes to provide the illumination source.

20. The method for adjusting color temperature of claim 14, wherein the step of performing the weighting operation for the global color temperature and the local color temperature comprises:
performing the weighting operation for the global color temperature and the local color temperature by a weighting formula, wherein the weighting formula comprises a combination of mathematical operations involving a first weighting function, a second weighting function, the global color temperature and the local color temperature.

21. The method for adjusting color temperature of claim 20, wherein the first weighting function is determined according to at least one of the second weighting function, a constant, a color coordinate transformation matrix, a time parameter, a user parameter, a scenario parameter and a location parameter, and the second weighting function is determined according to at least one of the first weighting function, the constant, the color coordinate transformation matrix, the time parameter, the user parameter, the scenario parameter and the location parameter.

22. The method for adjusting color temperature of claim 20, further comprising:
determining a color temperature range of the global color temperature according to a first color temperature and a second color temperature.

23. The method for adjusting color temperature of claim 22, wherein the step of performing the weighting operation for the global color temperature and the local color temperature by the weighting formula comprises: performing the weighting operation for the global color temperature and the local color temperature by the weighting formula when the global color temperature falls between the first color temperature and the second color temperature.

24. The method for adjusting color temperature of claim 23, further comprising:
adjusting the color temperature of the illumination source according to at least one of a preset color temperature, a user parameter, a scenario parameter and a location parameter when the global color temperature is greater than the first color temperature or less than the second color temperature.

25. The method for adjusting color temperature of claim 14, further comprising:
receiving a time parameter from the cloud database to determine an operation time of the lighting apparatus of adjustable color temperature,
wherein when determining that the operation time of the lighting apparatus of adjustable color temperature falls within a first time interval, performing the weighting operation for the global color temperature and the local color temperature to obtain the operation result for adjusting the color temperature of the illumination source.

26. The method for adjusting color temperature of claim 25, wherein when determining that the operation time of the lighting apparatus of adjustable color temperature falls within a second time interval, adjusting the color temperature of the illumination source according to at least one of a preset color temperature, a user parameter, a scenario parameter and a location parameter.

* * * * *